March 28, 1944.   J. V. CARON   2,345,458
WHEEL APPLYING DEVICE
Filed March 15, 1943   2 Sheets-Sheet 1
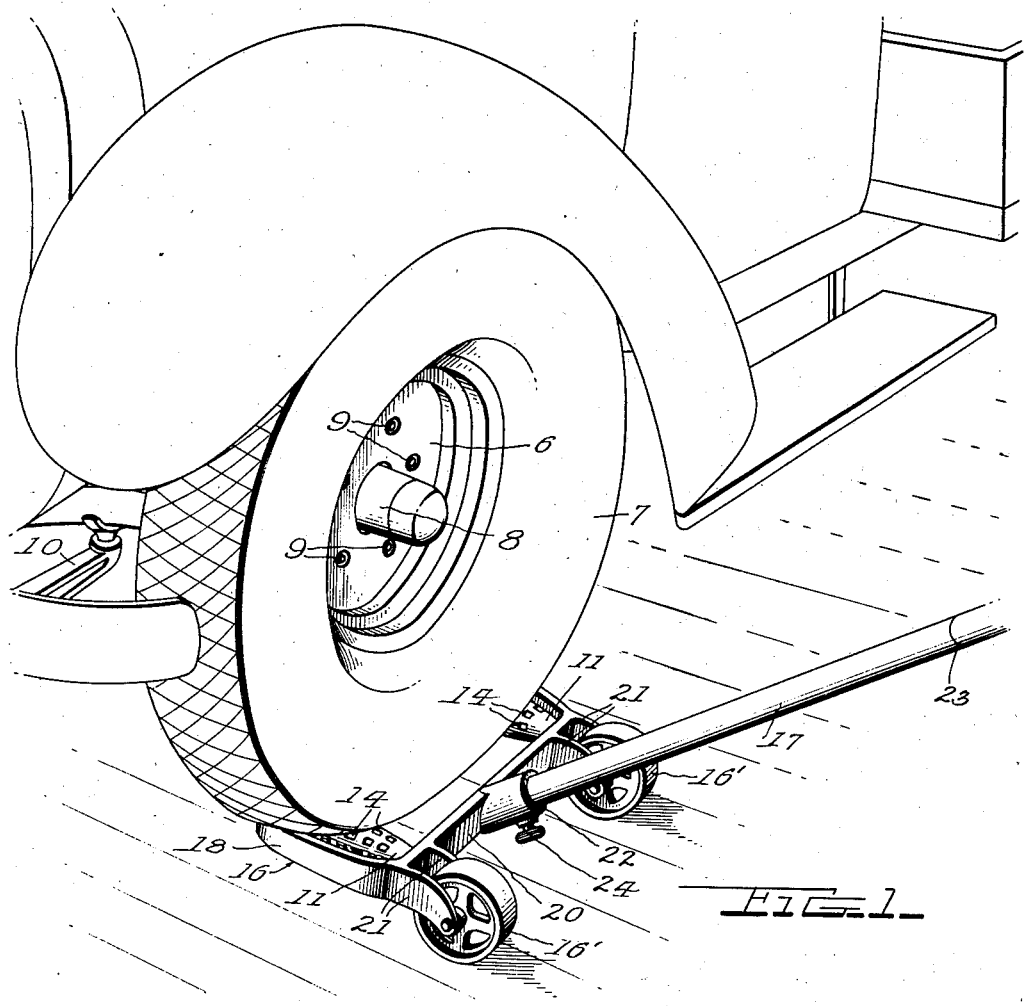
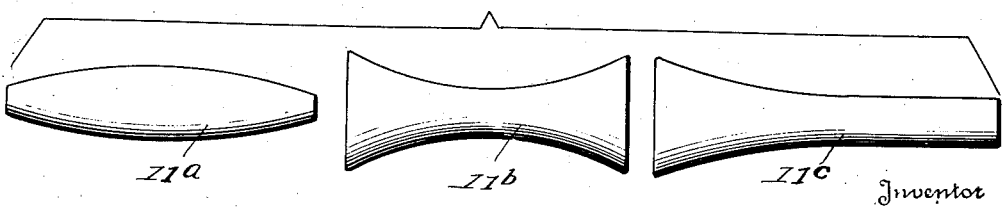
Inventor
J. V. Caron.
By H. B. Wilson & Co.
Attorney March 28, 1944.　　　J. V. CARON　　　2,345,458
WHEEL APPLYING DEVICE
Filed March 15, 1943　　　2 Sheets-Sheet 2
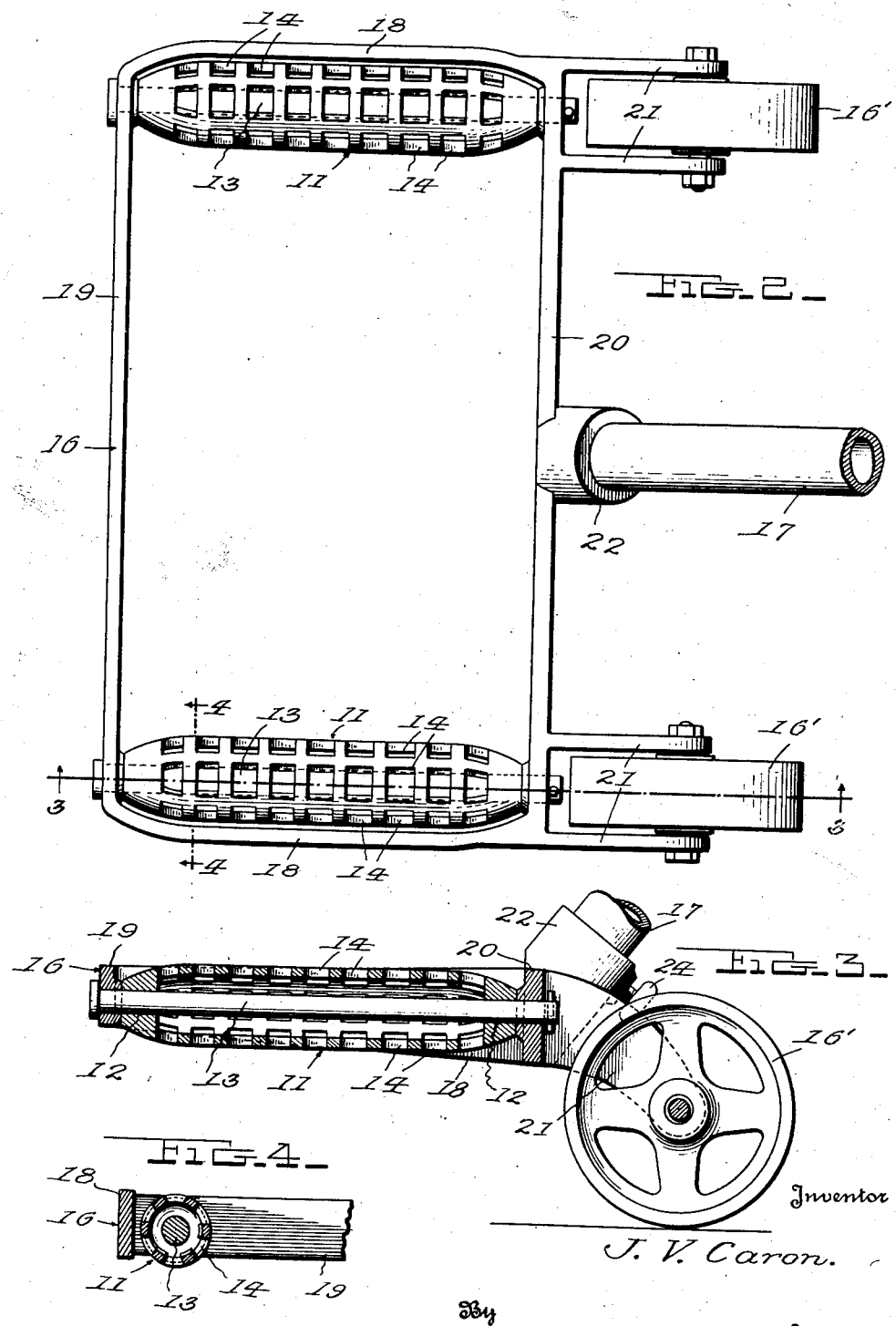
Inventor
J. V. Caron.
By
H. B. Wilson & Co.
Attorney Patented Mar. 28, 1944

2,345,458

UNITED STATES PATENT OFFICE 2,345,458

WHEEL APPLYING DEVICE

Joseph Victor Caron, Detroit, Mich.

Application March 15, 1943, Serial No. 479,276

2 Claims. (Cl. 280—53)

In mounting the heavy pneumatically tired wheels of airplanes, busses, trucks, trailers, tractors and the like upon the wheel hubs, and in mounting the tire-carrying rims of such machines upon their wheels, great difficulty is encountered in lifting and turning the wheel and tire as a unit, or the rim and tire as a unit, in order to place such unit in the proper position for inward movement onto the hub or the wheel, in readiness for application of the securing means (usually nuts to be threaded onto studs). Difficulty is also encountered when removing such tire-carrying units, and when moving them away from a machine for repair or change and back to the machine for reapplication. My invention, however, aims to provide a comparatively simple and inexpensive device which will so facilitate such operations as those referred to, as to permit one man to quickly and easily perform the labor heretofore often requiring two or more men a much longer time.

With the foregoing in view, the invention resides in the novel subject matter hereinafter described and claimed, description being accomplished by reference to the accompanying drawings.

Fig. 1 is a perspective view showing the invention in use for applying a heavy pneumatically tired demountable wheel of a truck.

Fig. 2 is a top plan view with the handle in horizontal section.

Fig. 3 is a vertical longitudinal section on line 3—3 of Fig. 2.

Fig. 4 is a detail transverse section on line 4—4 of Fig. 2.

Fig. 5 is a group view showing three of the many different kinds of tire-engaging rollers which may, if desired, be used in place of those illustrated in Figs. 1 to 4.

For simplification, the invention will be described and claimed only as a means for applying heavy pneumatically tired wheels, and it will be obvious that it may also be used for removing such wheels, and for applying and removing tire-carrying rims.

Briefly speaking, the invention comprises spaced rollers to extend transversely under the tire of a heavy pneumatically tired wheel to support said wheel for manual rotation, and a wheeled truck upon which said rollers are mounted, said truck including means whereby said rollers may be raised and lowered. Thus, the pneumatically tired wheel may be rolled or otherwise placed upon the rollers of the truck, may be carried to the machine upon said truck, and by proper manipulation of said truck may be raised or lowered to the proper elevation, and may then be turned or rotated by hand to the required amount, to permit inward movement of the wheel into operative position upon the hub in readiness for the usual securing means, said securing means usually being in the form of nuts to be threaded upon the conventional hub studs. During this wheel-applying operation, the axle of the machine is of course supported by a suitable jack. After the wheel is initially secured in place, the roller-carrying truck is pulled out from under the tire, the wheel securing operations are completed, and the jack then lowered and removed. The invention has been shown in connection with a wheel 6, tire 7 and hub 8 of a motor truck, for illustrative purposes, the conventional hub flange being provided with the customary threaded studs 9 to engage the usual wheel securing nuts. At 10, I have disclosed a portion of a conventional garage or service station jack supporting the weight at one corner of the truck, to be removed as usual after application of the pneumatically tired wheel.

The rollers may have any desired peripheral shape and while it is preferable to simply use two elongated rollers mounted on spaced parallel axes, it would of course be possible to use two or more relatively short rollers in place of each long roller. Rollers of the preferred construction are illustrated in Figs. 1 to 4, in which views each roller is denoted at 11. This roller is preferably of tubular form with reduced ends having bearing openings 12, which openings receive a roller-mounting shaft 13 suitably mounted on the wheeled truck. The tubular form of the roller 11 requires less material than a solid roller and reduces the weight of the device. Weight and required material are further reduced by forming the side wall of the roller 11 with a plurality of openings 14, which openings are also instrumental in preventing the tire 7 from slipping longitudinally of said roller.

Fig. 5 discloses three additional shapes of rollers at 11$^a$, 11$^b$ and 11$^c$, any of which may be substituted for the roller shape shown in Figs. 1 to 3, and said Fig. 5 also illustrates the fact that the rollers may, if desired, have smooth peripheries. It may also be explained that the rollers shown in this view may be considered as of either solid or tubular form, as desired. For simplification, from this point on, the description will refer only to the rollers 11 but it should be borne in mind that any other appropriate rollers may be employed.

The wheeled truck upon which the rollers 11 are mounted, is by preference a hand truck, and a single-handle truck has been disclosed, said truck comprising a substantially rectangular open frame 16 having supporting wheels 16' at its rear end, and a rearwardly projecting inclined handle 17. The rollers 11 are positioned within the frame 16 in rather close proximity to the side bars 18 thereof, the shafts 13 of said rollers being secured in alined openings in the front and rear frame bars 19 and 20. The rear bar 20 is provided with rearwardly projecting pairs of rigid arms 21 mounted on the supporting wheels 16'. The handle 17 is secured to the center of this bar 20, the bar being preferably provided with a rigid socket 22 in which the front end of said handle is secured. It is preferable to construct the handle 17 from detachably connected sections as indicated in a general way at 23 in Fig. 1, and to detachably secure the front section in the socket 22, for example, by means of a thumb screw 24. This permits shipping or carrying of the entire device in a compact disassembled condition.

Assuming that the tire 7 has been mounted upon the wheel 6 at a point somewhat remote from the truck, the tire and wheel as a unit may be rolled onto the rollers 11 of the present invention. One person may then hold the tire upright with one hand and push the wheeled truck with the other to easily carry the tire and wheel to the machine. The wheeled truck may be readily guided to place the wheel 6 upon the hub 8, and by raising or lowering the handle 17, said wheel may be placed at the required elevation. Then, by turning this wheel, which is readily permitted by the rollers 11, the wheel openings may be alined with the studs 9 as seen in Fig. 1, whereupon the wheeled truck with its load is pushed inwardly, positioning the wheel in readiness to be secured by application of the usual nuts to said studs. After the wheel and its tire have been rolled to the machine and initially placed on the hub 8, the operator may readily squat astride the handle 17 and virtually sit upon this handle with his feet resting against, say the rear bar 20 of the wheeled truck, leaving both of his hands free to grasp the tire 7. Then, by proper movement of his hands and feet, or by pressing down upon or relieving pressure upon the handle 17, the wheel may be accurately positioned and forced into final engagement with the hub.

From the foregoing, taken in connection with the accompanying drawings, it will be seen that novel and advantageous provision has been made for carrying out the object of the invention, and while preferences have been disclosed, attention is again invited to the possibility of making variations within the scope of the invention as claimed. In this connection, it will of course be obvious that the invention is not restricted to any particular material or materials, nor to any one size or proportion of parts.

I claim:

1. A wheel applying device comprising two laterally spaced horizontally elongated rollers to extend transversely under the tire of a pneumatically tired wheel to support said wheel for manual rotation, and a manually tiltable wheeled truck for supporting said rollers, said truck comprising a substantially rectangular open frame having a rigid front bar, a rigid rear bar, and two rigid side bars rigidly secured at their ends to the ends of said front and rear bars, supporting wheels behind the ends of said rear bar, bearing arms rigidly secured to said rear bar and projecting rearwardly therefrom, said bearing arms being supported by said wheels, and a rigid handle rigidly secured to the central portion of said rear bar and inclined rearwardly; said rollers extending from said rear bar to said front bar at the inner sides of said side bars, and means directly mounting the rear ends of said rollers on said rear bar in invariable positions and the front ends of said rollers on said front bar in invariable positions, whereby said rollers may be tilted to raise or lower them, by tilting said truck.

2. In a truck of the class described, a horizontal frame comprising a rear end bar, two side bars rigidly secured to and projecting forwardly from the ends of said rear end bar, and two pairs of short arms rigidly secured to and projecting rearwardly from the end portions of said rear end bar; two laterally spaced supporting wheels behind said rear end bar and upon which said short arms are mounted; two elongated rollers extending longitudinally of and disposed at the inner sides of said side bars, means mounting the rear ends of said rollers in invariable positions directly on the end portions of said rear end bar, means extending inwardly from the front ends of said side bars and supporting the front ends of said rollers in invariable positions, and a rearwardly inclined handle rigidly secured at its front end to the aforesaid frame.

JOSEPH VICTOR CARON.